United States Patent [19]

Kato et al.

[11] Patent Number: 5,085,300
[45] Date of Patent: Feb. 4, 1992

[54] HYDRAULIC DAMPER

[75] Inventors: Tetsuo Kato; Tomio Imaizumi, both of Kanagawa, Japan

[73] Assignee: Tokico Ltd., Kanagawa, Japan

[21] Appl. No.: 425,844

[22] Filed: Oct. 23, 1989

[30] Foreign Application Priority Data

Oct. 25, 1988 [JP] Japan .................................. 63-268991
Jun. 16, 1989 [JP] Japan .................................. 1-153722

[51] Int. Cl.$^5$ .............................................. F16F 9/52
[52] U.S. Cl. .................... 188/322.15; 188/280; 188/282; 188/317
[58] Field of Search .................... 188/316, 317, 322.13, 188/322.14, 322.15, 280, 282, 285

[56] References Cited

U.S. PATENT DOCUMENTS

| 4,352,417 | 10/1982 | Stinson | 188/322.15 |
| 4,685,545 | 8/1987 | Fannin et al. | 188/322.15 X |
| 4,905,799 | 3/1990 | Yamaoka et al. | 188/322.15 |

FOREIGN PATENT DOCUMENTS

| 0174119 | 3/1986 | European Pat. Off. | 188/322.15 |
| 1092642 | 11/1967 | United Kingdom | 188/322.15 |
| 1492721 | 11/1977 | United Kingdom . | |

Primary Examiner—Matthew C. Graham
Attorney, Agent, or Firm—Wendroth, Lind & Ponack

[57] ABSTRACT

A hydraulic damper according to the present invention includes a cylinder, working fluid disposed in the cylinder, a piston partitioning the cylinder into two fluid chambers and including passages therethrough for providing fluid communication between the two fluid chambers, and a damping force generation mechanism. The damping force generation mechanism includes a large diameter valve disc mounted adjacent the passages, a smaller diameter valve disc stacked against the large diameter valve disc, an inner pressure chamber formed adjacent and in fluid communication with the passages, and an outer pressure chamber formed adjacent and in fluid communication with the passages and formed radially outwardly of the inner pressure chamber. A partition wall is formed between the inner and outer pressure chambers and a passage is formed through the partition wall for communicating between the inner and outer pressure chambers. The outer pressure chamber is formed of a plurality of chambers spaced circumferentially about a longitudinal axis of the cylinder. In an alternative embodiment, rather than utilizing two separate valve discs, a single valve disc can be used in combination with a biasing spring for biasing the valve disc toward the inner and outer pressure chambers.

6 Claims, 10 Drawing Sheets

HYDRAULIC DAMPER

BACKGROUND OF THE INVENTION

The present invention relates to a hydraulic damper adapted for use in a vehicle or the like.

Figure 1:
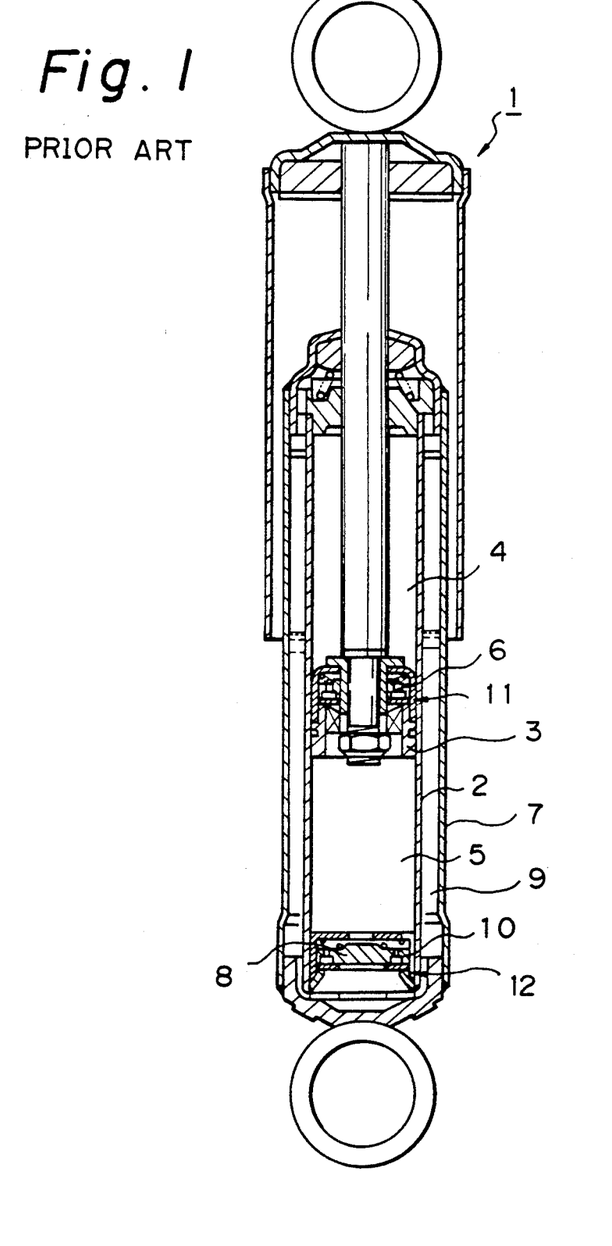
FIG. 1 is a vertical sectional view showing a hydraulic damper according to the prior art.

As shown in FIG. 1, a prior art hydraulic damper 1 which has been in general use is so constructed that the interior of a cylinder 2 is divided into two chambers 4, 5 by a piston 3 slidably fit in the cylinder 2, the chambers 4, 5 being respectively in communication with each other through communication passages 6 formed in the piston 3. A chamber 9, defined between the cylinder 2 and an outer cylindrical body 7 and the chamber 5 in the cylinder 2 are in communication with each other through a communication passage 10 formed through a partition member 8 mounted to a bottom part of the cylinder 2. In a hydraulic damper with such a construction, a sliding movement of the piston 3 in the cylinder 2 causes the flow movement of the hydraulic fluid therein through communication passages 6. At that time, the flow of the hydraulic fluid may be controlled by damping force generation mechanisms 11, 12 comprising a plurality of valve discs and orifice passages which provide for generation of a damping force.

Figure 2:
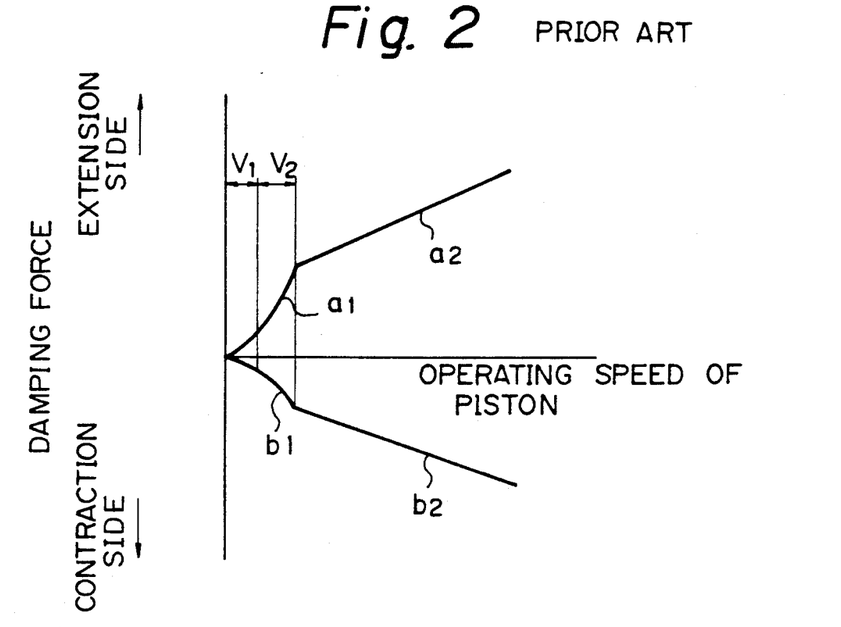
FIG. 2 is a diagram showing the damping force characteristics of the prior art hydraulic damper shown in FIG. 1.

The damping force characteristics as obtained by the hydraulic damper 1 of the above construction are as illustrated in FIG. 2. As it is seen from FIG. 2, when the operating speed of the piston 3 is slow, the hydraulic fluid is throttled when it flows through the orifice passage, so that a representative characteristic curve is like that of a quadratic curve as designated by references $a_1$ and $b_1$. When the operating speed of the piston 3 is fast, the valve discs may be deflected due to hydraulic pressure, and a characteristic curve representative thereof is linear as designated by references $a_2$ and $b_2$.

As explained above the operation of, the prior art hydraulic damper 1 is represented by a quadratic characteristic curve with regard to the characteristics produced by the orifice passage (or orifice characteristics). Therefore at the initial stage of operation of the piston (or the interval designated by $V_1$ in FIG. 2), a small damping force is generated out the damping force is subsequently rapidly increased.

It is to be noted, however, that a certain large damping force will be required at the initial stage of operation of the piston in order to prevent staggering of a vehicle during normal driving and to thereby provide for more stable driving. However, the above-described orifice cannot adequately meet this requirement. Further, since a large damping force will have been generated during the period following the initial operational stage (or the period $V_2$ shown in FIG. 2), vibration caused at the side of the wheels may be transmitted to the vehicle body whereby driving comfort may be impaired.

In this way, since the hydraulic damper according to the prior art is not capable of adequately adapting the damping force provided therefore to the particular vehicle, optimum driving stability and comfort are not attained, this conventional hydraulic damper is used.

SUMMARY OF THE INVENTION

The present invention has been proposed in view of the problems pointed out above and has as an object to provide a hydraulic damper which is capable of establishing optimum damping force characteristics for specific vehicles.

The present invention provides a hydraulic damper comprising a cylinder, a piston slidably fit in the cylinder such that it partitions the interior of said cylinder into two liquid chambers. The piston being provided with a communication passage formed therethrough for communicating the two liquid chambers with each other and a damping force generation mechanism for generating damping force by controlling the flow of liquid through the communication passage during sliding movement of the piston in the cylinder. The damping force generation mechanism includes a large diameter disc valve disposed on the downstream side of the communication passage and a smaller diameter valve disc stacked adjacent the large diameter valve disc, the diameter of the smaller diameter valve disc being smaller than that of the large diameter valve disc, an inner pressure chamber disposed radially inwardly from and on the side of the large diameter valve disc opposite from the smaller diameter valve disc, the inner pressure chamber being in communication with the communication passage, and an outer pressure chamber disposed on the same side as and radially outwardly from the inner pressure chamber, the outer pressure chamber being located radially outwardly of the outer circumference of the smaller diameter valve disc and, the outer pressure chamber being in communication with the communication passage.

In one embodiment, the damping force generation mechanism preferably includes a pre-set load setting means for giving the smaller diameter valve disc on initial deflection.

The present invention also provides a hydraulic damper comprising a cylinder, a piston slidably fit in the cylinder such that it partitions the interior of the cylinder into two liquid chambers. The piston is provided with a communication passage formed therethrough for communicating the two liquid chambers with each other and a damping force generation mechanism for generating damping force by controlling the flow of liquid through the communication passage during sliding movement of the piston in the cylinder. The damping force generation mechanism includes a disc valve disposed on the downstream side of the communication passage, inner and outer pressure chambers disposed at different locations in the radial direction of the valve disc and respectively being in communication with the communication passage, the inner and outer pressure chamber being adapted to impose hydraulic pressure on the valve disc, and a biasing means disposed on the opposite side of the valve disc remote from the pressure chambers for biasing the valve disc toward the pressure chambers, the biasing means being located in a location adjacent a partition wall separating the inner and outer pressure chambers.

According to the present invention, the smaller diameter valve disc is stacked against the larger diameter valve disc, and the valves are designed such that they open when the fluid pressure in the pressure chamber increases to a level which is higher than another level of hydraulic pressure at which the outer circumference portion of the large diameter valve disc is deflected. Therefore, as the hydraulic pressure in the respective pressure chambers is increased due to the movement of the piston, the outer peripheral portion of the larger diameter valve disc is first deflected so that a damping force corresponding to the normal valve characteristic is generated. As the hydraulic pressure in the respective pressure chambers is further increased, both the large diameter valve disc and the smaller diameter valve disc are deflected so that a different damping force characteristic is generated. Thus, it is possible to provide an overall damping force characteristic which is the product of characteristics due to different valve arrangements.

It is possible to change the pressure at which the respective valve disc open and thus the rate of change of the valve characteristics by changing the rigidity of the respective valve disc. It is therefore possible to obtain a higher damping force during the initial stage of operation of the piston in which the piston speed is slow, and to keep the damping force at a low level in the normal operational range in which the operating speed of the piston becomes higher. Thus, it is possible to obtain appropriate damping force characteristics corresponding to specific vehicles.

In a hydraulic damper further including a pre-set load setting means for giving the smaller diameter valve disc an initial deflection, it is also possible to raise the pressure at which the smaller diameter valve disc opens without changing the rigidity of the discs or the number of the discs. It may also be possible to raise the pressure at which the smaller disc valve opens even if the rigidity of the valve disc is reduced.

In the type of damper in which the valve disc is biased by a biasing member, as the hydraulic pressure in the respective pressure chambers is increased due to the movement of the piston, the outer circumference portion of the disc is first deflected to generate a particular damping force characteristic.

As the hydraulic pressure in the respective pressure chamber is further increased, the entire valve disc will be deflected against the biasing force of the spring member to generate a damping force of with different characteristics. In this manner, a damping force having a combination of the above characteristics may be obtained.

Since it is possible to change the pressure level at which the valve disc opens and the rate of change of the damping force by suitably changing the rigidity of the valve disc and the spring constant of the biasing means or spring member, it is possible to establish appropriate damping force characteristics different vehicles.

BRIEF EXPLANATION OF THE DRAWINGS

It is to be noted that the constructions shown in FIG. 7, FIG. 9, FIG. 10, FIG. 11 and FIG. 14 are symmetrical in their left and right halves and only the right halves are shown in these drawings.

DETAILED DESCRIPTION OF THE PREFERRED EMBODIMENTS

Preferred embodiments of the present invention will now be explained by referring to the accompanying drawings.

Figure 3:
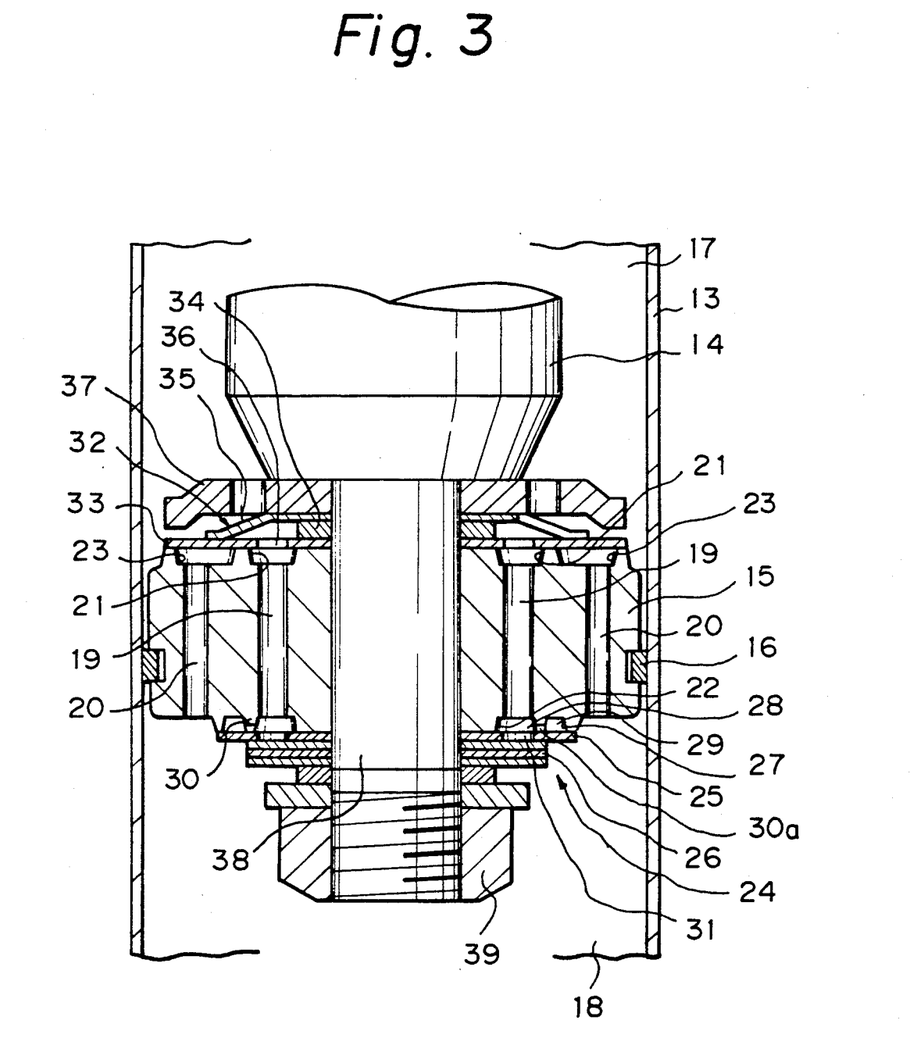
FIG. 3 is a vertical sectional view of an essential part of a hydraulic damper according to a first embodiment of the present invention.

FIG. 3 illustrates a first embodiment of the present invention, the construction of which will now be explained.

A piston 15 attached to a piston rod 14 is slidably fit in a cylinder 13 with a piston ring 16 therebetween. The interior of the cylinder 13 is divided into an upper cylinder chamber 17 and a lower cylinder chamber 18 by the piston 15. The piston 15 is provided with extension and contraction communication passages 19 and 20, respectively, formed therethrough and extending generally in parallel with the axis of the piston rod 14. These passages 19 and 20 communicate the upper cylinder chamber 17 with the lower cylinder chamber 18 during extension and contraction, respectively. One end of the extension communication passage 19 opens into an annular groove 21 formed at the upper end surface of the piston 15 while the other end thereof opens into to an annular groove 22 formed at the lower end surface of the piston 15. On the other hand, one end of the contraction communication passage 20 opens into the lower cylinder chamber 18 and the other end of the passage 20 opens into a groove chamber 23 formed in the upper end surface of the piston 15 radially outwardly of the annular groove 21.

An extension damping force generation mechanism 24 adapted to generate a damping force during the extension stroke of the piston 15 is provided at the lower side of the piston, which is the downstream side of the extension communication passage 19. The construction of this mechanism will next be explained.

A valve disc 25 of a large diameter is seated on the lower end surface of the piston 15 and a plurality of valve disc 26 of a smaller diameter are stacked against the surface of the large diameter valve disc 25 which faces away from the extension communication passage 19.

It is to be noted that the annular groove 22 which is formed in the lower end surface of the piston 15 and into which the extension communication passage 19 opens is located radially inwardly of the outer circumference of the smaller diameter valve disc 26. It is also to be noted that an annular groove 27 is formed in the lower end surface of the piston 15 and is located radially outwardly of the annular groove 22, radially outwardly of the outer circumference of the smaller diameter valve disc 26 and radially inwardly of the outer circumference of the larger diameter valve disc 25. An inner pressure chamber 28 is defined by the annular groove 22 and the large diameter valve disc 25 while an outer pressure chamber 29 is defined by the annular groove 27 and the large diameter valve disc 25. The pressure chambers 28, 29 communicate with each other through a plurality of throttling passages 30a formed in the partition wall 30 formed between said pressure chambers 28, 29. As explained later, the smaller diameter valve disc is adapted to provide a fulcrum for the large diamater valve disc adjacent to the partition wall 30 defined between the inner and outer pressure chambers when the outer circumference portion of the large diameter valve disc is deflected.

The rigidity of the smaller diameter valve disc 26 is selected so that the outer peripheral portion of the large diameter valve disc 25 is first deflected away from the lower end surface of the piston 15 when the hydraulic pressure in the outer pressure chamber 29 increases to $F_1$ (see FIG. 4) and then the smaller diameter valve disc 26 is caused to open when the hydraulic pressure in the inner pressure chamber increases to $F_2$ which is larger than $F_1$. It is to be understood that the rigidity of the valve discs 25, 26 may be determined by selecting the wall thickness and the material of the discs. Alternatively, the large diameter valve disc 25 may be provided with a plurality of holes 31 spaced apart from each other in the circumferential direction thereof, as shown in FIG. 3, so as to reduce the rigidity of the outer peripheral portion of the larger diameter valve disc 25. Those holes are preferably formed in an area of the large diameter valve disc which is covered by the smaller diameter valve disc. The holes are also located to be adjacent the outer circumference of the smaller diameter valve disc.

A check valve mechanism 32 is provided on the upper end surface of the piston 15. The check valve mechanism will now be explained.

A valve disc 33 is seated on the upper end surface of the piston 15 in such a manner as to cover the annular grooves 21, 23 formed on the upper end surface. The valve disc 33 is biased against the piston 15 by a leaf spring 35 attached to the piston 15 through a retainer 34. A plurality of bores 36 are formed through the valve disc 33 at the locations corresponding to the annular groove 21 into which the extension communication passage 19 opens, and the bores 36 serve to communicate the upper cylinder chamber 17 with the extension communication passage 19. It is to be noted that numeral 37 in FIG. 3 designates a washer adapted to restrict deflection of the valve disc 33.

In the check valve mechanism 32 constructed in this way, as the hydraulic pressure in the contraction communication passage 20 is increased during the contraction stroke of the piston, the valve disc 33 is caused to deflect against the biasing force of the leaf spring 35 so that the hydraulic fluid is caused to flow from the lower cylinder chamber 18 to the upper cylinder chamber 17.

It is to be understood that the damping force in the contraction strokes will be generated by a contraction damping force generation mechanism provided at the bottom end of the hydraulic damper, which is not shown.

The check valve mechanism 32, the piston 15 and the damping force generation mechanism 24 are fitted on a small diameter portion 38 of the piston rod 14 and tightened and secured to the small diameter portion by a nut 39 threaded on the end of the portion 38.

The operation of the hydraulic damper constructed as explained above will now be explained with reference to FIG. 3 and FIG. 4.

First, as the piston 15 is pulled upwardly by way of the piston rod 14 during the extension stroke, the pressure in the upper cylinder chamber 17 increases, causing the hydraulic fluid to flow through the extension communication passage 19.

At this time, the hydraulic fluid flows into the inner pressure chamber 28 from the extension communication passage 19 and further flows through the throttling passage 30a to the outer pressure chamber 29, increasing thereby the hydraulic pressure in the respective pressure chambers 28, 29. When the hydraulic pressure in the outer pressure chamber 29 is increased to the level of $F_1$, the outer peripheral portion of the large diameter valve disc 25 is deflected to open the valve. This operation generates a damping force as represented by the line $C_1$ in FIG. 4. As the operating speed of the piston is further increased, the flow of the hydraulic fluid from the inner pressure chamber 28 to the outer pressure chamber 29 is restricted by the throttling passage 30a and, when the hydraulic pressure in the inner pressure chamber 28 is increased to the level of $F_2$, the large diameter valve disc 25 and the smaller diameter valve disc 26 are deflected to an open position. This operation generates damping force as represented by the line $C_2$ in FIG. 4.

Figure 4:
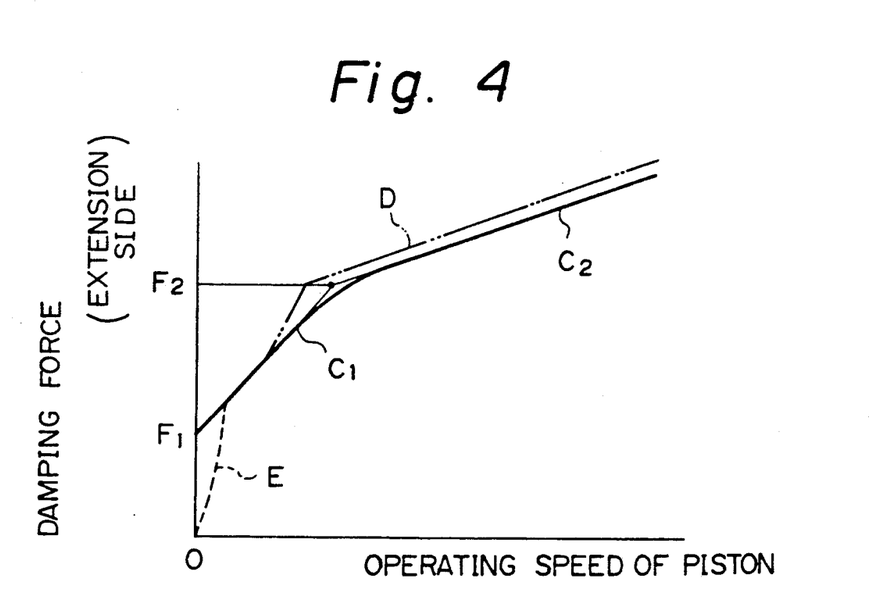
FIG. 4 is a diagram showing the damping force characteristics of the hydraulic damper according to the first embodiment of the present invention.

The values of pressure such as $F_1$ and $F_2$ and the gradient of the lines $C_1$ and $C_2$ in the damping force characteristic curve as shown in FIG. 4 may be easily adjusted by changing the amount of initial deflection and the rigidity of the respective valves disc 25, 26.

Furthermore, if the opening area of the throttling passage 30a between the pressure chambers 28, 29 is made smaller, the damping characteristic produced thereby may be added to the damping force characteristic explained above. In this manner, a damping force characteristic as shown by the line D (two dot chain line) in FIG. 4 may be attained.

It is also possible to attain a damping force characteristic such as shown by the line E (dashed line) in FIG. 4 by forming a cut-out (not shown) at the outer circumference portion of the larger diameter valve disc 25 to define a passage for communicating the communication passage 19 with the lower cylinder chamber 13.

In this manner, the damping force generated may be set at a high level even when the operating speed of the piston 15 is slow. By modifying the above described parameters, damping force characteristics which are optimum for specific vehicles may be established, thereby providing excellent driving reliability and driving comfort.

Another embodiment of the present invention will now be explained.

Figure 5:
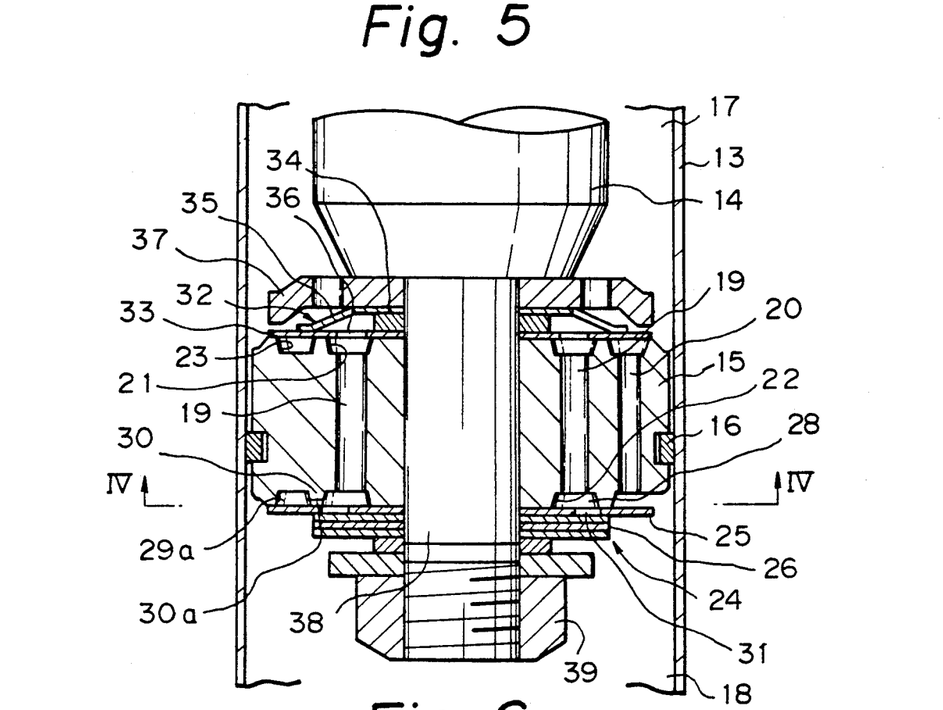
FIG. 5 is a vertical sectional view of an essential part of a hydraulic damper according to a second embodiment of the present invention.
Figure 6:
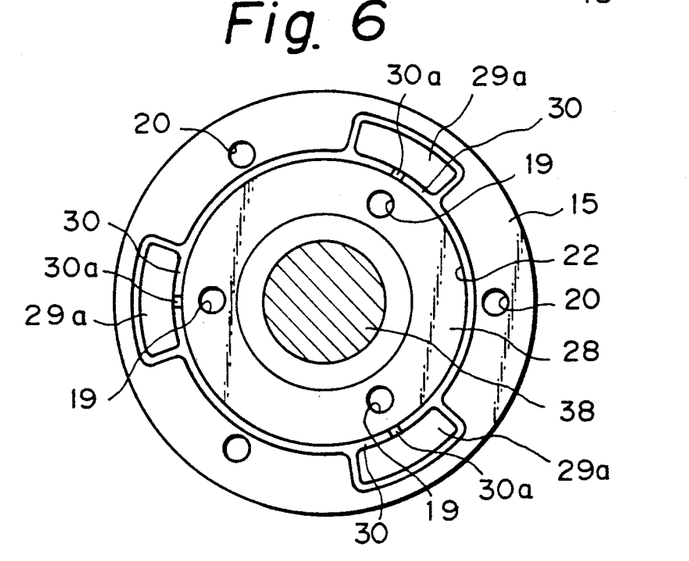
FIG. 6 is a sectional view taken along the line IV—IV in FIG. 5.

The second embodiment shown in FIG. 5 and FIG. 6 is different from the first embodiment only with respect to the configuration of the outer pressure chamber formed in the lower end surface of the piston 15. More specifically, in this embodiment three outer pressure chambers 29a are provided at equal distances from the axis of the piston 15 and are spaced equally from each other in the circumferential direction. Contraction communication passages 20 are formed at the portions between respectively adjacent ones of the pressure chambers 29a. Since the remaining construction is the same as that of the first embodiment, the same numerals are used to designate the same elements and the explanation thereof is not repeated. Since the operation is also the same as that of the first embodiment, the explanation thereof is not repeated.

Figure 7:
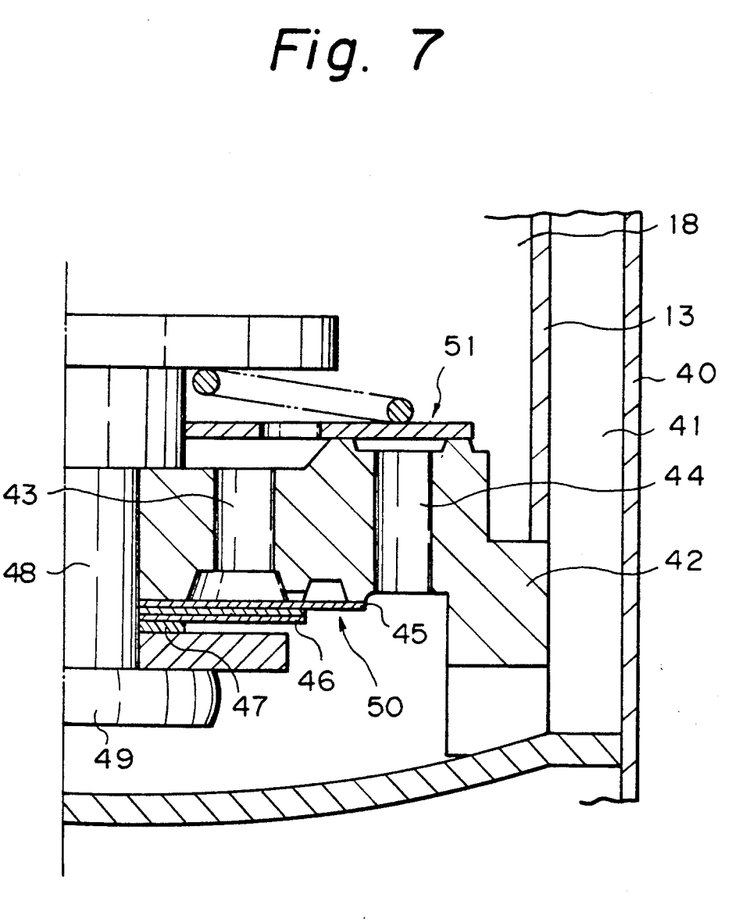
FIG. 7 is a vertical sectional view of an essential part of a hydraulic damper according to a third embodiment of the present invention.

In the third embodiment shown in FIG. 7, an arrangement similar to that utilized in embodiments one and two is arranged at the bottom end of the hydraulic damper. It is to be noted in connection with this embodiment that the damping force for the contraction stroke is generated at the bottom end of the hydraulic damper.

A partition member 42 adapted to separate a lower cylinder chamber 18 and an auxiliary chamber 41 defined between a cylinder 13 and an outer cylindrical body 40 is formed with an extension communication passage 44 and a contraction communication passage 43 which communicates the lower cylinder chamber 18 with the auxiliary chamber 41. On the downstream side of the contraction communication passage 43, there are stacked along a shaft member 48 attached to the partition member 42, a large diameter valve disc 45, a plurality of smaller diameter valve disc 46 and a spacer 47, in that order. These parts are held together by a nut 49, thereby constituting a contraction damping force generation mechanism 50.

On the downstream side of the extension communication passage 44, there is provided a check valve mechanism 51 which allows the hydraulic fluid in the auxiliary chamber 41 to flow into the lower cylinder chamber 18 through the communication passage 44 only during the extension stroke of the piston.

Since the operation of this embodiment is also the same as that of the first embodiment already described, the explanation thereof is not repeated.

FIGS. 8 to 12 show other embodiments in which a preset load setting means is provided for giving an initial deflection to the smaller diameter valve disc 26 in the second and third embodiments, respectively. The same members as those of the aforementioned embodiments are denoted by the same numerals and the detailed explanation thereof is not repeated.

Figure 8:
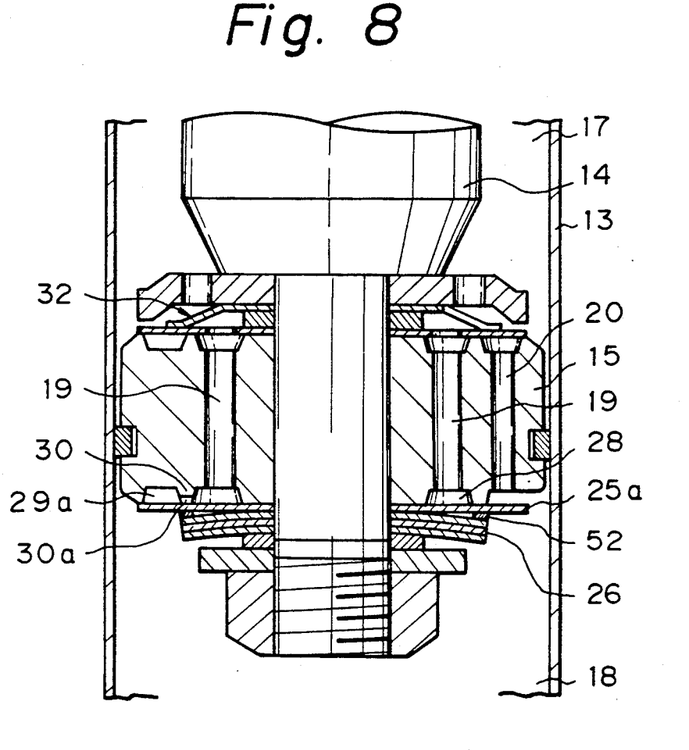
FIG. 8 is a vertical sectional view of the essential part of a hydraulic damper according to a fourth embodiment of the present invention.

The difference between the fourth embodiment shown in FIG. 8 and the second embodiment above described is in that a pre-set load setting means is used to provide the smaller diameter valve disc 26 with an initial deflection. The pre-set load setting means includes a ring 52 interposed between the outer peripheral end portion of the smaller diameter valve disc 26 and a large diameter disc valve 25a. It is to be noted that no holes (such as in FIG. 3) 31 for reducing the rigidity of the larger diameter valve disc 25a are formed in the large diameter disc valve in this embodiment.

Figure 17:
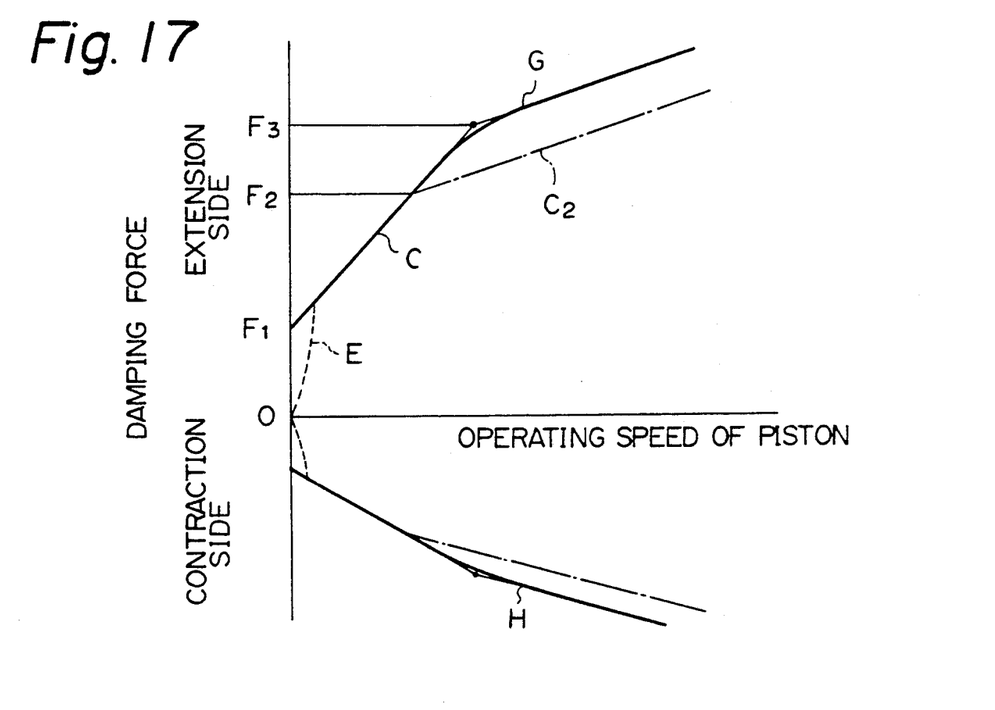
FIG. 17 is a diagram showing the damping force characteristics obtained by the fourth embodiment shown in FIG. 8 and the fifth embodiment shown in FIG. 9.

According to this embodiment, the outer, peripheral portion of the smaller diameter valve disc 26 is deflected by the ring 52 away from the large diameter valve disc 25a so that the pressure at which the smaller diameter valve disc 26 is to open is changed to a level $F_3$ higher than the level $F_2$ of the second embodiment (this damping force characteristic is represented by the line G in FIG. 17). The pressure $F_3$ may be appropriately adjusted by changing the thickness (the width in the axial direction) of the ring 52 to alter the initial deflection the smaller diameter valve disc 26.

In order to raise the pressure at which the smaller diameter valve disc opens the smaller diameter valve disc 26 may be made thicker so as to increase the rigidity thereof. Alternatively, the number of discs to be used may be increased. However, these methods of adjustment will necessarily cause the proportion of increase of the damping force (the gradient of the line G in FIG. 17) to be so large that a desired damping force characteristic. Further, the weight of the valve disc will increase the overall weight of the hydraulic damper be increased and the entire length of the hydraulic damper will have to be longer. On contrast, the present embodiment, utilizing the ring 52, allows the pressure at which the smaller diameter valve disc 26 opens to be changed without changing the proportion of increase of the damping force and without causing the weight and the length of the hydraulic damper to be increased. Thus, the hydraulic damper may be made light and compact.

Figure 9:
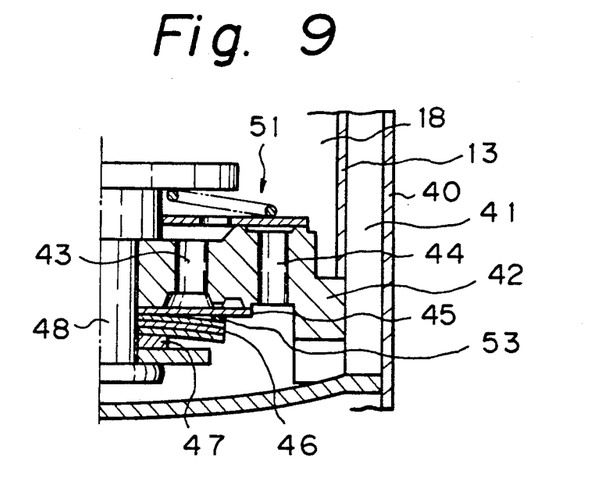
FIG. 9 is a vertical sectional view of an essential part of a hydraulic damper according to a fifth embodiment of the present invention.

The fifth embodiment, shown in FIG. 9, is characterized in that a pre-set load setting means is provided for giving an initial deflection to the smaller diameter valve disc 46 employed in the third embodiment. The pre-set load setting means in this embodiment includes a ring 53 interposed between the outer peripheral end portion of the smaller diameter valve disc 46 and the large diameter valve disc 45. Since the operation of this embodiment is the same as that of the fourth embodiment as described above, the explanation thereof is omitted here (the damping force characteristic attained by this embodiment is represented by the line H in FIG. 17).

Figure 10:
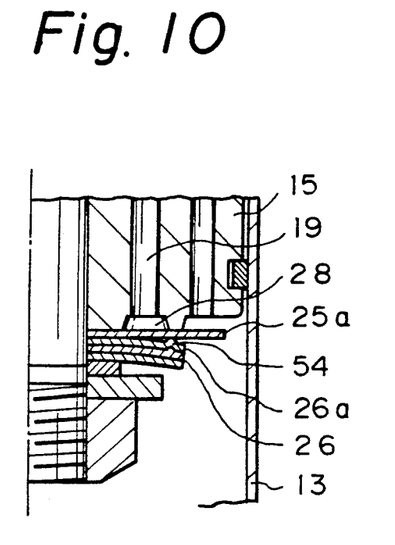
FIG. 10 is a vertical sectional view of an essential part of a hydraulic damper according to a sixth embodiment of the present invention.

The sixth embodiment, shown in FIG. 10, is characterized in that a smaller diameter valve disc 26a is provided with a projection 54 formed integrally therewith adjacent to the outer peripheral portion thereof. This projection functions as a pre-set load setting means. The tip end of the projection 54 is so designed as to abut against the large diameter valve disc 25a to provide the smaller diameter valve disc 26a with an initial deflection. It is to be understood that this projection 54 may be formed partially or entirely along the circumference of the smaller diameter valve disc 26a. It is also to be noted that the smaller diameter valve disc 26a formed with the projection 54 may be turned upside down so that the tip end of the projection 54 will be in abutment with another small diameter valve disc 26.

Figure 11:
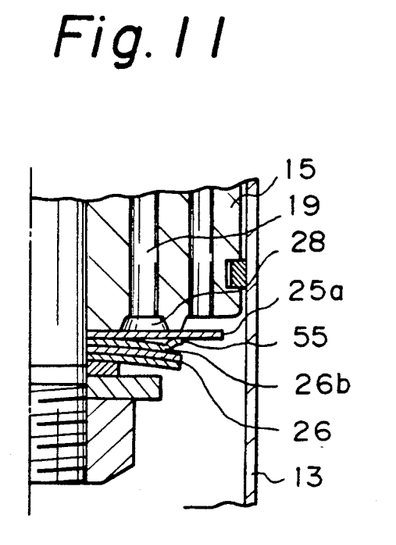
FIG. 11 is a vertical sectional view of an essential part of a hydraulic damper according to a seventh embodiment of the present invention.

The seventh embodiment as illustrated in FIG. 11 is characterized in that a smaller diameter valve disc 26b with a stepped portion 55 formed by bending of the disc is used in place of the smaller diameter disc valve 26a formed with the projection 54 in the sixth embodiment. This stepped portion 55 is so designed as to abut against a large diameter disc valve 25a, such that the smaller diameter valve disc 26b may be provided with an initial deflection. It is also to be noted that this stepped portion 55 may be formed partially or entirely along the circumference of the smaller diameter valve disc 26b. The smaller diameter valve disc 26b formed with said stepped portion 55 may be turned upside down so that the stepped portion 55 may be in abutment with another smaller diameter valve disc 26. The function of the sixth and seventh embodiments is similar to that of the fourth embodiment, but the costs for the former two embodiments may be reduced by an amount equal to the cost of the ring 52 which is used in the fourth embodiment. It is also possible to apply the smaller diameter valve disc 26a, 26b of the construction used in the sixth and seventh embodiments to the fifth embodiment so as to provide the smaller diameter valve disc 46 with an initial deflection instead of using the ring 53 for this purpose.

Figure 12:
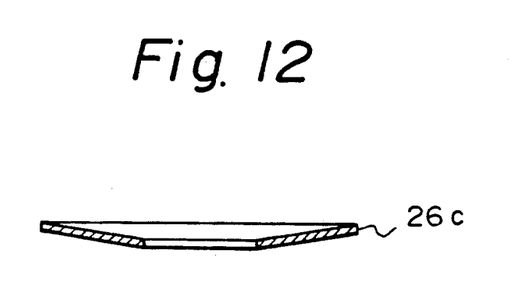
FIG. 12 is a vertical sectional view of a small diameter disc valve to be employed in a hydraulic damper according to an eighth embodiment of the present invention.

The eighth embodiment illustrated in FIG. 12 represents another pre-set load setting means. This means comprises a smaller diameter valve disc 26c which is deformed into a dish-shape in advance. By compressing this smaller diameter valve disc 26c such that it becomes flat (in a manner similar to the smaller diameter valve disc 26, 46 in the first and the third embodiments), the smaller diameter valve discs 26 are provided with initial deflection. It is to be noted in this case that the pressure at which the smaller diameter valve disc 26c opens may be suitably adjusted by changing the amount of deformation of the valve disc into a dish-shape or the number of the dish-shaped discs which make up the valve.

Figure 13:
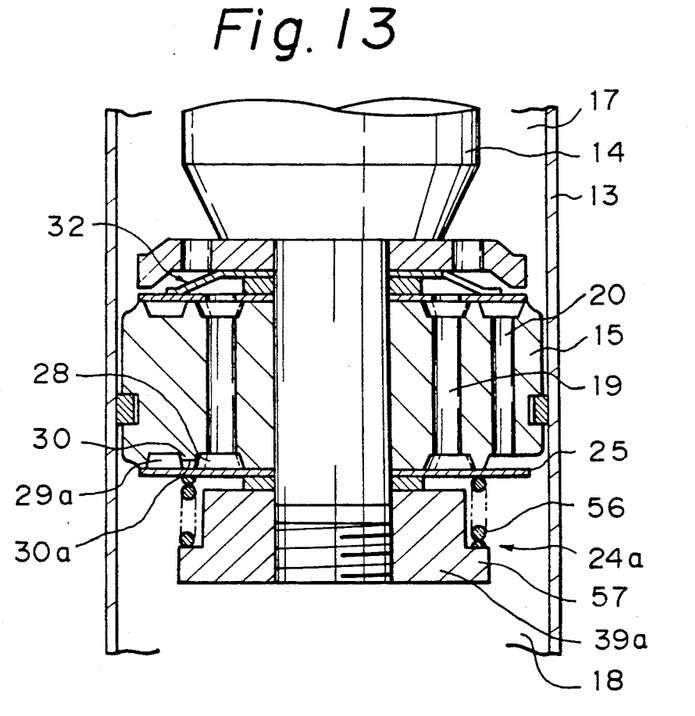
FIG. 13 is a vertical sectional view of an essential part of a hydraulic damper according to a ninth embodiment of the present invention.

A ninth embodiment of the present invention will now be explained by referring to FIG. 13.

According to this embodiment, a spring 56 is used in place of the smaller diameter valve disc 26 of the second embodiment. The same members as those used in the second embodiment are denoted with the same numerals in this embodiment and detailed explanations thereof are not repeated.

A flange portion 57 is formed integrally with a nut 39a which is used to assemble an extension damping force generation mechanism 24a. A spring member 56 comprising a coil spring is interposed between the flange portion 57 and the larger diameter valve disc 25. It is to be noted that the position at which the spring member 56 abuts against the large diameter valve disc 25 corresponds to the location of a partition wall 30 between the inner pressure chamber 28 and the outer pressure chamber 29a.

If the spring member 56 is interposed in such a manner as to abut against the large diameter valve disc without biasing it, it will perform the same function as that of the smaller diameter valve disc 26 in the second embodiment. If the spring member is interposed in such a manner as to bias the larger diameter valve disc 25, it will perform an identical function to that of the smaller diameter valve disc 26 in the fourth embodiment in which an initial deflection is given by the pre-set load setting means. It is also possible to attain various damping force characteristics by changing the rigidity of the large diameter valve disc and the elasticity of the spring member 56.

Figure 14:
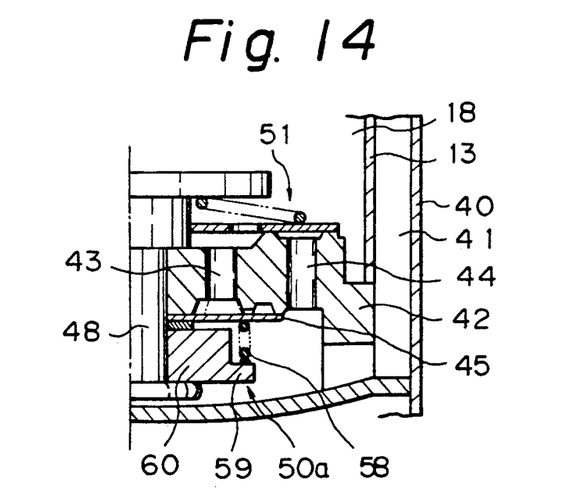
FIG. 14 is a vertical sectional view of an essential part of a hydraulic damper according to a tenth embodiment of the present invention.

The tenth embodiment illustrated in FIG. 14 has applied a spring member 58 to a contraction damping force generation mechanism 50a provided at the bottom side of the hydraulic damper in place of the smaller diameter valve disc 46 of the third embodiment, in a manner similar to that shown in the ninth embodiment.

According to this embodiment, a retainer 60 integrally formed with a flange 59 is provided and a spring member 58 comprising a coil spring is interposed between the flange portion 59 and the large diameter valve disc 45. It is to be understood that the function of this embodiment is the same as that of the ninth embodiment as described above.

Figure 15:
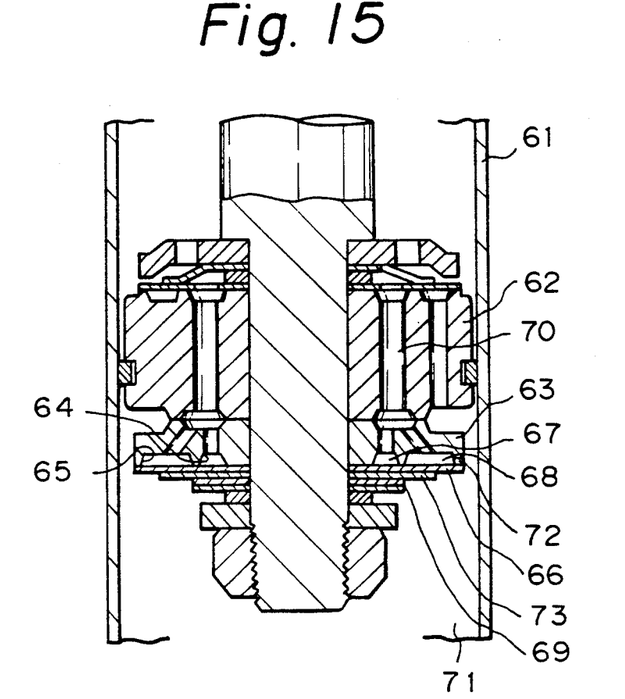
FIG. 15 is a vertical sectional view of an essential part of a hydraulic damper according to an eleventh embodiment of the present invention.

FIG. 15 shows an eleventh embodiment which provides that the damping force will change gradually with the operating speed of the piston. The construction of this embodiment will now be described.

A retainer 63 is connected to the lower end surface of a piston 62 slidably fit within a cylinder 61. Two concentric annular grooves 64, 65 formed in said retainer 63 and a large diameter valve disc 66 which abuts against the retainer 63 define an inner pressure chamber 67 and an outer pressure chamber 68, respectively. The inner pressure chamber 67 is disposed radially outwardly of the outer circumference of a smaller diameter valve disc 69. On the other hand, the outer pressure chamber 68 is disposed radially outwardly of the outer circumference of the smaller diameter valve disc 69 and radially inwardly of the outer circumference of the large diameter valve disc 66. An extension communication passage 70 is branched at the junctions between the piston 62 and the retainer 63 to communicate with both the inner pressure chamber 67 and the outer pressure chamber 68.

At the outer circumference of the retainer 63 in abutment with the large diameter valve disc 66, there is formed a passage 72 comprising a cut-out which communicates the outer pressure chamber 68 with a lower cylinder chamber 71.

Between the large diameter valve disc 66 and the smaller diameter valve disc 69, there is interposed an intermediate diameter valve disc 73 which has the diameter smaller than that of the large diameter valve disc 66 and larger than that of the smaller diameter valve disc 69. The rigidity of the intermediate diameter valve disc 73 is selected so that the outer periphery portion of the larger diameter valve disc 66 is deflected when the pressure in the outer pressure chamber increases to $F_1$ and the intermediate diameter valve disc 73 is deflected when the pressure in the outer pressure chamber increased to $F_3$ which is larger than $F_1$ ($F_1 < F_3$). In the meantime, the rigidity of the smaller diameter valve disc 69 is selected so that it is deflected when the pressure in the inner pressure 67 increases to $F_2$ which is larger than $F_3$ ($F_2 > F_3 > F_1$).

The remaining construction, shown in FIG. 15, is the same as that of the first embodiment, so that explanation thereof is not repeated.

The operation of the embodiment shown in FIG. 15 will next be explained by referring to FIG. 15 and FIG. 18.

Figure 18:
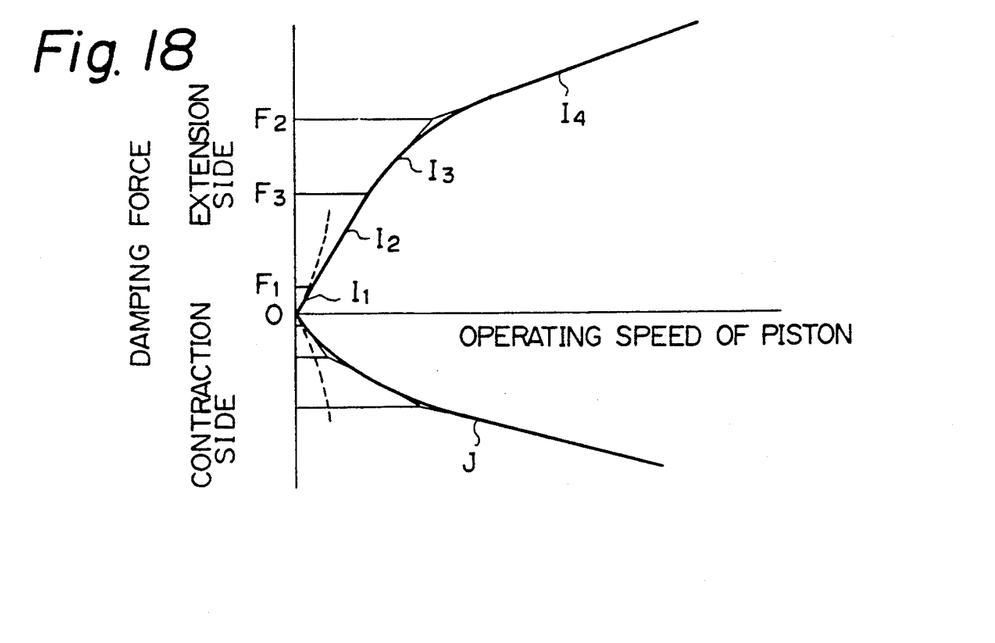
FIG. 18 is a diagram showing the damping force characteristics obtained by the eleventh embodiment shown in FIG. 15 and the twelfth embodiment shown in FIG. 16.

As the piston 62 is pulled upwardly during the extension stroke and the hydraulic fluid in the communication passage 70 is caused to move, thereby increasing the pressure in the inner pressure chamber 67 and the outer pressure chamber 68, the damping force characteristic as represented by the line $I_1$ in FIG. 18 will first be due to the pressure in passage 72, and then, as the hydraulic pressure in the outer pressure chamber 68 is raised to the level of $F_1$, the outer peripheral portion of the large diameter valve disc 66 will be deflected to generate the damping force represented by the line $I_2$ in FIG. 18. When the pressure in the outer pressure chamber 68 is increased to the level of $F_3$, the intermediate diameter valve disc 73 will be deflected to generate the damping force represented by the line $I_3$ in FIG. 18. When the hydraulic pressure in the inner pressure chamber 27 is further raised to the level of $F_2$, the smaller diameter valve disc 69 is deflected to generate the damping force represented by the line $L_4$ in FIG. 18.

In this way, by providing an optimum combination of the damping forces provided successively by the pressure in passage 72 and by deflection of the respective valve disc 66, 69, 73, a gradually changing damping force characteristic may be attained.

In the embodiment described above, three kinds of valve disc, (the large diameter valve disc 66, the intermediate diameter valve disc 73 and the smaller diameter valve disc 69 have been employed, more than four kinds of valve discs having different diameters, the smaller diameter valve discs providing higher pressure at which the concerned valves open, may be employed. The more valve discs having different diameters that are used, the more gradual will be change in the damping force.

Figure 16:
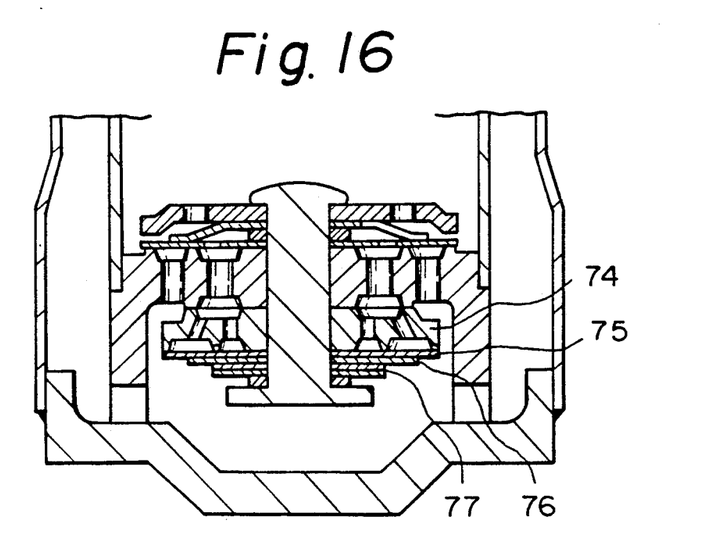
FIG. 16 is a vertical sectional view of an essential part of a hydraulic damper according to a twelfth embodiment of the present invention.

The twelfth embodiment, shown in FIG. 16, utilizes the construction of the eleventh embodiment for a damping force generation mechanism located at the bottom end of the hydraulic damper. Since the construction of the retainer 74 and the constructions of the respective valve discs 75, 76, 77 shown in FIG. 16 are identical to those in the eleventh embodiment and the construction of the remaining elements are identical to those of the third embodiment, their explanations are omitted here. It is also to be noted that the function is the same as that of the embodiment of FIG. 11 (the damping force characteristic is represented by the line J in FIG. 18).

It is apparent that the present invention should not be limited to the respective embodiments described above, and may be constructed in, for example, the in the following manner.

With regard to the inner pressure chamber and the outer pressure chamber in the respective embodiments, any configuration may be applied as long as the configuration permits the hydraulic pressure in the communication passages to be properly imposed to the valve discs.

Any number of the respective valve discs may be suitably selected so that the optimum damping force characteristic is attained for the particular vehicle in question.

It is further possible in the respective embodiments that the extension damping force generation mechanism provided on a piston and the contraction damping force generation mechanism provided at the bottom end of the hydraulic damper may be suitably combined and that the damping force characteristic during the extension stroke may be different than during the contraction stroke or they may be identical, depending on the requirement.

As explained in detail, the hydraulic damper according to the present invention includes a large diameter valve disc and a smaller diameter valve disc which are caused to open at different pressure levels and are stacked on the downstream side of a communication passage, an inner pressure chamber in communication with the communication passage provided on the side of the large diameter disc valve facing the communication passage, and an outer pressure chamber in communication with the communication passage provided radially outwardly of the outer circumference of the smaller diameter valve disc. As the hydraulic fluid pressure in the outer and inner pressure chambers is increased due to movement of the piston, the outer peripheral portion of the large diameter valve disc the remainder of the large diameter valve disc and the smaller diameter valve disc are sequentially opened so as to generate the desired damping force. By changing the rigidity of the valve disc, therefore, the damping force characteristics may be adjusted.

In addition, if a pre-set load setting means is employed, the pressure level at which the smaller diameter valve disc opens may be raised, thus providing a wider range within which the damping force characteristics can be adjusted.

Furthermore, as a spring member may be employed in place of the smaller diameter valve disc and, the damping force characteristics may be freely adjusted by changing the elasticity of the spring member.

In this manner, optimum damping force characteristics may be established for a specific vehicle, whereby driving stability and driving comfort are considerably improved.

Furthermore, the valve disc or spring member may mounted in a simple manner such that no special technique is needed to assemble them and assembly of the hydraulic damper is very efficient.

What is claimed is:

1. A hydraulic damper comprising:
   a cylinder having an interior in which a working fluid is adapted be disposed, and a longitudinal axis;
   means for partitioning said interior of said cylinder into two fluid chambers and for causing the working fluid to flow between said two fluid chambers, said partitioning means including passage means for providing fluid communication between said two fluid chambers, and piston means, axially slidably mounted in said interior of said cylinder, for forcing the working fluid through said passage means; and
   damping force generation means, for generating a damping force by controlling the flow of the working fluid through said passage means, comprising
   a large diameter valve disc mounted adjacent said passage means,
   a smaller diameter valve disc stacked against a surface of said large diameter valve disc opposite said passage means and having a diameter smaller than the diameter of said large diameter valve disc,
   an inner pressure chamber formed adjacent said passage means, radially inwardly of an outer circumference of said large diameter valve disc and against a surface of said large diameter valve disc opposite said smaller diameter valve disc,
   an outer pressure chamber formed adjacent and in fluid communication with said passage means, radially outwardly of said inner pressure chamber, radially outwardly of an outer circumference of said smaller diameter valve disc, radially inwardly of said outer circumference of said large diameter valve disc and against said surface of said large diameter valve disc opposite said smaller diameter valve disc, said outer pressure chamber comprising a plurality of chambers spaced circumferentially about said longitudinal axis of said cylinder, and
   a partition wall defined between said inner and outer pressure chambers and a passage formed through said partition wall and communicating between said inner and outer pressure chambers, said outer pressure chamber communicating with said passage means through said passage and said inner pressure chamber.

2. A hydraulic damper as claimed in claim 1, wherein
said partition wall is defined at a radial position substantially the same as that of the outer circumference of said smaller diameter valve disc; and
said smaller diameter valve disc is adapted to act as a fulcrum about which said large diameter valve disc is adapted to deflect.

3. A hydraulic damper as claimed in claim 1, wherein a plurality of holes are formed through said large diameter valve disc in an area thereof against which said smaller diameter valve disc is stacked and adjacent an outer circumference of said smaller diameter valve disc.

4. A hydraulic damper as claimed in claim 1, wherein said partition wall is spaced from said piston means.

5. A hydraulic damper as claimed in claim 1, wherein said passage means is formed through said piston means.

6. A hydraulic damper as claimed in claim 1, wherein
said passage means comprises a first communication passage means for allowing the working fluid to flow between said two fluid chambers in one direction, and a second communication passage means for allowing the working fluid to flow between said two fluid chambers in another direction substantially opposite said one direction, said second communication passage means being located intermediate two adjacent ones of said plurality of chambers of said outer pressure chamber in a circumferential direction;
said damping force generation means is operable to control the flow of the working fluid through said first communication passage means of said passage means; and
said large diameter valve disc is mounted adjacent said first communication passage means of said passage means.

* * * * *